US011732646B2

(12) United States Patent
Gauthier

(10) Patent No.: US 11,732,646 B2
(45) Date of Patent: Aug. 22, 2023

(54) LUBRICATION SYSTEM FOR A TURBINE ENGINE

(71) Applicant: Pratt & Whitney Canada Corp., Longueuil (CA)

(72) Inventor: Felix Gauthier, Longueuil (CA)

(73) Assignee: Pratt & Whitney Canada Corp., Longueuil (CA)

( * ) Notice: Subject to any disclaimer, the term of this patent is extended or adjusted under 35 U.S.C. 154(b) by 218 days.

(21) Appl. No.: 17/368,375

(22) Filed: Jul. 6, 2021

(65) Prior Publication Data

US 2023/0012413 A1 Jan. 12, 2023

(51) Int. Cl.
*F02C 7/06* (2006.01)
*F01D 25/20* (2006.01)

(52) U.S. Cl.
CPC .............. *F02C 7/06* (2013.01); *F01D 25/20* (2013.01); *F05D 2260/602* (2013.01); *F05D 2260/98* (2013.01)

(58) Field of Classification Search
CPC .......... F01D 19/00; F01D 19/02; F01D 25/18; F01D 25/20; F05D 2260/98; F05D 2260/602; F02C 7/06
See application file for complete search history.

(56) References Cited

U.S. PATENT DOCUMENTS

| 3,876,345 | A | * | 4/1975 | Froede | F02B 55/04 418/87 |
| 4,905,644 | A | * | 3/1990 | Masclet | B01D 37/046 210/132 |
| 5,018,601 | A | * | 5/1991 | Waddington | F16N 29/02 184/6.26 |
| 5,555,722 | A | * | 9/1996 | Mehr-Ayin | F02C 7/32 60/788 |
| 5,693,217 | A | * | 12/1997 | Erdmannsdoerfer | F01M 1/10 184/6.24 |
| 8,201,664 | B2 | * | 6/2012 | Brouillet | F01D 25/20 184/6.24 |
| 10,458,278 | B2 | * | 10/2019 | Avis | F01D 25/16 |
| 10,711,642 | B2 | * | 7/2020 | Parnin | F01D 25/20 |
| 11,053,815 | B2 | * | 7/2021 | Schwarz | F01D 25/18 |
| 2003/0230274 | A1 | * | 12/2003 | Williams | F01M 1/10 123/196 R |
| 2016/0305284 | A1 | * | 10/2016 | Mastro | F01D 25/20 |

(Continued)

OTHER PUBLICATIONS

EP search report for EP22183186.0 dated Jan. 9, 2023.

*Primary Examiner* — Michael A Riegelman
(74) *Attorney, Agent, or Firm* — Getz Balich LLC

(57) ABSTRACT

A lubrication system is provided for a turbine engine. A lubricant source includes a source outlet. Feed circuits are fluidly coupled with the source outlet in parallel. The feed circuits include a first feed circuit and a second feed circuit. The second feed circuit includes a pump with a pump inlet and a pump outlet. A bypass circuit is fluidly coupled with the pump inlet and the pump outlet. A bleed circuit is fluidly coupled with the first feed circuit. A flow regulator is configured to regulate flow through the bypass circuit during a first mode of operation and a second mode of operation. The flow regulator is configured to close the bleed circuit during the second mode of operation. A sensor system is configured to monitor fluid flow directed to the first feed circuit and/or the second feed circuit.

20 Claims, 6 Drawing Sheets

(56) References Cited

U.S. PATENT DOCUMENTS

| | | | | |
|---|---|---|---|---|
| 2017/0314419 A1* | 11/2017 | Bowan | .................... | F04D 13/04 |
| 2018/0283211 A1* | 10/2018 | Parnin | .................... | F01D 19/00 |
| 2018/0283283 A1* | 10/2018 | Manoukian | ............... | F02C 9/00 |
| 2018/0306062 A1* | 10/2018 | Avis | ........................ | F01M 1/02 |
| 2019/0271241 A1* | 9/2019 | Hassall | .................... | F01M 1/08 |
| 2019/0292944 A1* | 9/2019 | Mason | .................... | F01M 1/02 |
| 2020/0208536 A1* | 7/2020 | Bowan | .................... | F01D 3/04 |
| 2020/0340574 A1* | 10/2020 | Sbabo | .................... | F16H 57/045 |
| 2022/0397060 A1* | 12/2022 | Winter | ...................... | F02C 7/32 |
| 2023/0010133 A1* | 1/2023 | Gauthier | ................ | F01D 19/02 |
| 2023/0012413 A1* | 1/2023 | Gauthier | ................ | F01D 19/02 |
| 2023/0092811 A1* | 3/2023 | Palmer | .................... | F02C 3/22 |

\* cited by examiner

LUBRICATION SYSTEM FOR A TURBINE ENGINE

BACKGROUND OF THE DISCLOSURE

1. Technical Field

This disclosure relates generally to a turbine engine and, more particularly, to a lubrication system for the turbine engine.

2. Background Information

A turbine engine includes a lubrication system for providing lubricant to one or more components such as, for example, bearings and a gear box. Various types and configurations of lubrication systems are known in the art. While these known lubrications systems have various benefits, there is still room in the art for improvement. There is a need in the art therefore for an improved lubrication system for a turbine engine.

SUMMARY OF THE DISCLOSURE

According to an aspect of the present disclosure, a lubrication system is provided for a turbine engine. This lubrication system includes a lubricant source, a plurality of feed circuits, a bypass circuit, a bleed circuit, a flow regulator and a sensor system. The lubricant source includes a source outlet. The feed circuits are fluidly coupled with the source outlet in parallel. The feed circuits include a first feed circuit and a second feed circuit. The second feed circuit includes a pump. The pump includes a pump inlet and a pump outlet. The bypass circuit is fluidly coupled with the pump inlet and the pump outlet. The bleed circuit is fluidly coupled with the first feed circuit. The flow regulator is configured to regulate flow through the bypass circuit during a first mode of operation and a second mode of operation. The flow regulator is configured to close the bleed circuit during the second mode of operation. The sensor system is configured to monitor fluid flow directed to the first feed circuit and/or the second feed circuit.

According to another aspect of the present disclosure, another lubrication system is provided for a turbine engine. This lubrication system includes a lubricant source, a first turbine engine component, a pump, a bypass circuit, a bleed circuit, a second turbine engine component, a flow regulator and a sensor system. The lubricant source includes a source outlet. The first turbine engine component includes a first volume. The first volume is fluidly coupled with the source outlet. The pump includes a pump inlet and a pump outlet. The pump inlet is fluidly coupled with the source outlet in parallel with the first volume. The bypass circuit includes a bypass inlet and a bypass outlet. The bypass inlet is fluidly coupled with the pump outlet. The bypass outlet is fluidly coupled with the pump inlet. The bleed circuit includes a bleed inlet and a bleed outlet. The bleed inlet is fluidly coupled with the source outlet upstream of the first volume. The second turbine engine component includes a second volume. The second volume is fluidly coupled with the bleed outlet. The flow regulator is configured to facilitate fluid flow through the bypass circuit and to facilitate fluid flow through the bleed circuit during a first mode of operation. The flow regulator is configured to prevent fluid flow through the bleed circuit during a second mode of operation. The sensor system is configured to monitor fluid flow downstream of the source outlet.

According to still another aspect of the present disclosure, another lubrication system is provided for a turbine engine. This lubrication system includes a boost pump, a first turbine engine component, a bypass circuit, a second fluid circuit and a valve. The boost pump includes a pump inlet and a pump outlet. The first turbine engine component includes a first volume. The first volume is fluidly coupled with and downstream of the pump outlet. The bypass circuit includes a bypass inlet and a bypass outlet. The bypass inlet is fluidly coupled with the pump outlet upstream of the first volume. The bypass outlet is fluidly coupled with and upstream of the pump inlet. The second fluid circuit is configured in parallel with the boost pump. The valve is configured to: facilitate fluid flow through the bypass circuit and through the second fluid circuit during a first mode of operation; and prevent fluid flow through the second fluid circuit during a second mode of operation.

The lubrication system may include a sensor system with a sensor fluidly coupled in parallel with the pump inlet and the second fluid circuit. The sensor system may be configured to detect when the valve is stuck in an open position during the second mode of operation. The valve may be configured to facilitate fluid flow through the bypass circuit and through the second fluid circuit when in the open position.

The flow regulator may include a first chamber, a second chamber and a moveable body. The first chamber may be configured to fluidly couple a first segment of the bypass circuit with a second segment of the bypass circuit when the moveable body is in a first position and a second position. The second chamber may be configured to fluidly couple a first segment of the bleed circuit with a second segment of the bleed circuit when the moveable body is in the first position. The second chamber may be configured to be fluidly decoupled from the first segment of the bleed circuit and/or the second segment of the bleed circuit when the moveable body is in the second position.

The flow regulator may also include a third chamber and a biasing element. The biasing element may be arranged within the third chamber. The biasing element may be configured to bias the moveable body towards the second position.

The third chamber may be fluidly coupled with the second segment of the bleed circuit when the moveable body is in the second position.

The sensor system may be configured to detect a malfunction of the flow regulator.

The sensor system may include a fluid pressure sensor.

The lubrication system may also include a turbine engine component including an internal volume. The internal volume may be fluidly coupled with the pump outlet downstream of the bypass circuit.

The lubrication system may also include a turbine engine component including an internal volume. The bleed circuit may fluidly couple the first feed circuit to the internal volume during the first mode of operation.

The lubrication system may also include a turbine engine component including an internal volume. The internal volume may be fluidly coupled to the first feed circuit downstream of the bleed circuit.

The second feed circuit may also include a flow restrictor fluidly coupled with and between the source outlet and the pump inlet.

The lubrication system may also include a turbine engine component including an internal volume. The feed circuits may include a third feed circuit that fluidly couples the source outlet to the internal volume.

The pump may be a first pump. The lubricant source may include a second pump and a lubricant reservoir. The second pump may be fluidly coupled with and between the lubricant reservoir and the plurality of feed circuits.

The pump may be configured as or otherwise include a boost pump.

The first mode of operation may be a cold start mode of operation.

The flow regulator may include a first chamber, a second chamber and a moveable body. The first chamber may be configured to fluidly couple an upstream segment of the bypass circuit with a downstream segment of the bypass circuit when the moveable body is in an open position. The first chamber may also be configured to fluidly couple the upstream segment of the bypass circuit with the downstream segment of the bypass circuit when the moveable body is in a closed position. The second chamber may be configured to fluidly couple an upstream segment of the bleed circuit with a downstream segment of the bleed circuit when the moveable body is in the open position. The second chamber may be configured to be fluidly decoupled from the upstream segment of the bleed circuit and/or the downstream segment of the bleed circuit when the moveable body is in the closed position.

The lubrication system may also include a third turbine engine component including a third volume. The third volume may be fluidly coupled with the pump outlet downstream of the bypass inlet.

The sensor system may be configured to detect a low flow condition to the third turbine engine component.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
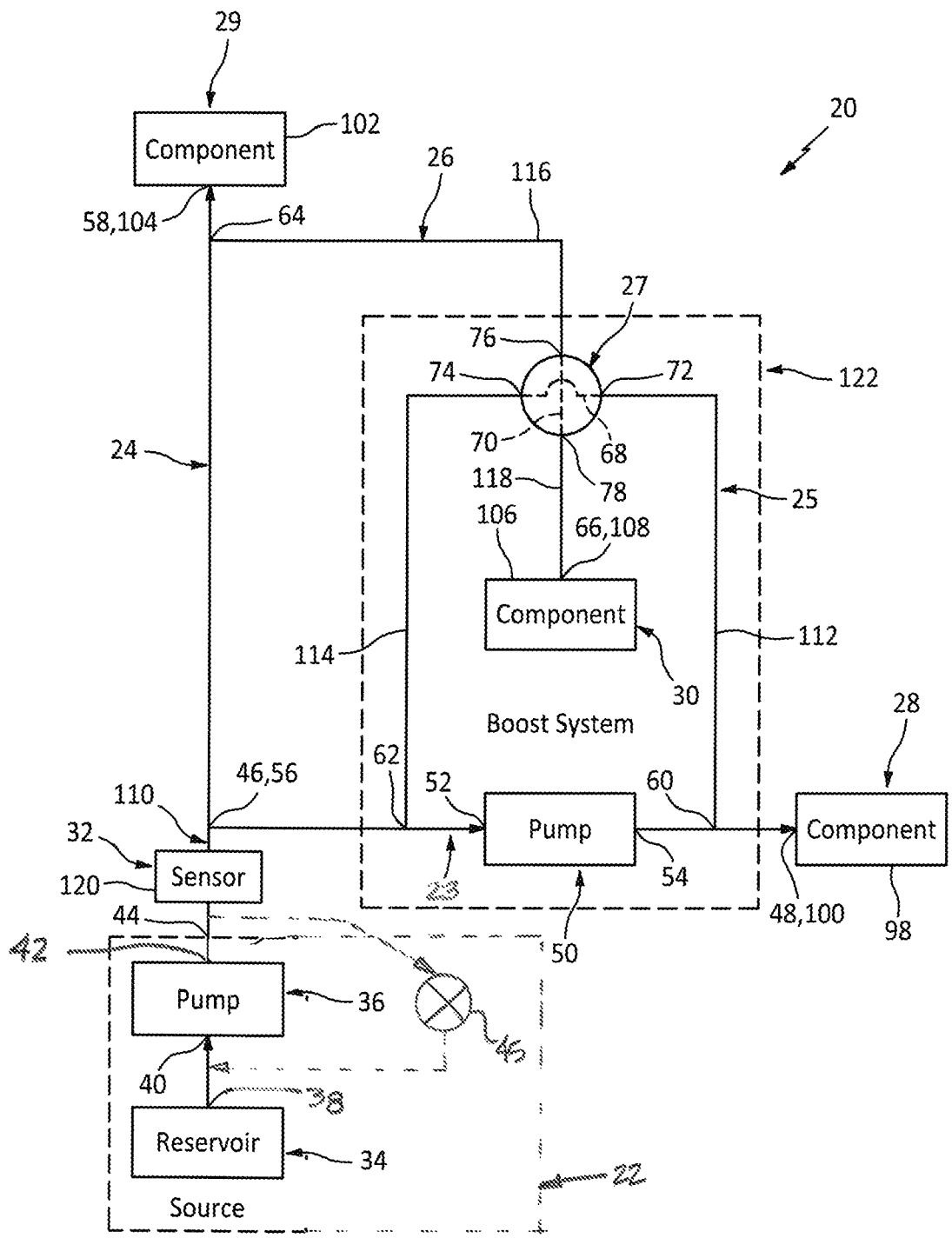
FIG. 1 is a schematic illustration of a lubrication system for a turbine engine.

FIG. 1 illustrates a lubrication system 20 for a turbine engine such as, but not limited to, a turbofan turbine engine, a turbojet turbine engine, a turboshaft turbine engine or a turboprop turbine engine. This lubrication system 20 includes a lubricant source 22, one or more lubricant feed circuits 23 and 24, a lubricant bypass circuit 25, a lubricant bleed circuit 26, a flow regulator 27, and one or more other components 28-30 of the turbine engine. The lubrication system 20 of FIG. 1 also includes a sensor system 32.

The lubricant source 22 is configured to provide lubricant (e.g., oil) to one or more other components of the lubrication system 20 during lubrication system operation. The lubricant source 22 may also be configured to store the lubricant during lubrication system operation and/or while the lubrication system 20 is non-operational (e.g., before and/or after lubrication system operation/turbine engine operation). The lubricant source 22 of FIG. 1, for example, includes a lubricant reservoir 34 and a lubricant main pump 36.

The reservoir 34 may be configured as or otherwise include a container; e.g., a tank, a cylinder, a pressure vessel, a bladder, etc. The reservoir 34 is configured to contain and hold a quantity of the lubricant. The reservoir 34 of FIG. 1 includes a reservoir outlet 38.

The main pump 36 may be configured as a primary lubricant pump for the lubrication system 20. This main pump 36 may be a gear pump or a centrifugal pump. The main pump 36 may be mechanically actuated through, for example, an accessory gearbox for the turbine engine. Alternatively, the main pump 36 may be electrically actuated through, for example, an electric motor. The present disclosure, however, is not limited to the foregoing exemplary lubricant main pump configurations. The main pump 36 of FIG. 1 includes a main pump inlet 40 and a main pump outlet 42, which main pump outlet 42 may also be an outlet 44 for the lubricant source 22.

The main pump inlet 40 is fluidly coupled with and downstream of the reservoir outlet 38. With this arrangement, the main pump 36 is configured to direct (e.g., pump) the lubricant contained within the reservoir 34 and out of the lubricant source 22 through the source outlet 44 during lubrication system operation. In some embodiments, a fluid regulator 45 (e.g., a bypass valve) may be fluidly coupled with and between the outlet 44 and main pump inlet 40. This fluid regulator 45 may be configured to direct (e.g., divert) a portion of lubricant pumped out by the lubricant main pump 36 back to its inlet 40.

The feed circuit 23 extends between a feed inlet 46 of the feed circuit 23 and a feed outlet 48 of the feed circuit 23. The feed circuit 23 includes a lubricant boost pump 50. This boost pump 50 is configured to boost pressure of the lubricant received from the lubricant source 22, and then direct (e.g., pump) the now pressure boosted lubricant to the turbine engine component 28. The boost pump 50 may be configured as a gear pump. The boost pump 50 may be mechanically actuated through, for example, the accessory gearbox for the turbine engine. Alternatively, the boost pump 50 may be electrically actuated through, for example, an electric motor. The present disclosure, however, is not limited to the foregoing exemplary lubricant boost pump configurations. The boost pump 50 of FIG. 1 includes a boost pump inlet 52 and a boost pump outlet 54.

The feed circuit 24 extends between a feed inlet 56 of the feed circuit 24 and a feed outlet 58 of the feed circuit 24.

The bypass circuit 25 extends between a bypass inlet 60 of the bypass circuit 25 and a bypass outlet 62 of the bypass circuit 25.

The bleed circuit 26 extends between a bleed inlet 64 of the bleed circuit 26 and a bleed outlet 66 of the bleed circuit 26.

The flow regulator 27 may be a (e.g., single) valve configured with multiple internal flowpaths. The flow regulator 27 of FIG. 1, for example, includes an internal first flowpath 68 and an internal second flowpath 70 which is fluidly discrete from the first flowpath 68. The first flowpath 68 extends between a first regulator inlet 72 and a first regulator outlet 74. The second flowpath 70 extends between a second regulator inlet 76 and a second regulator outlet 78.

Figure 2A:
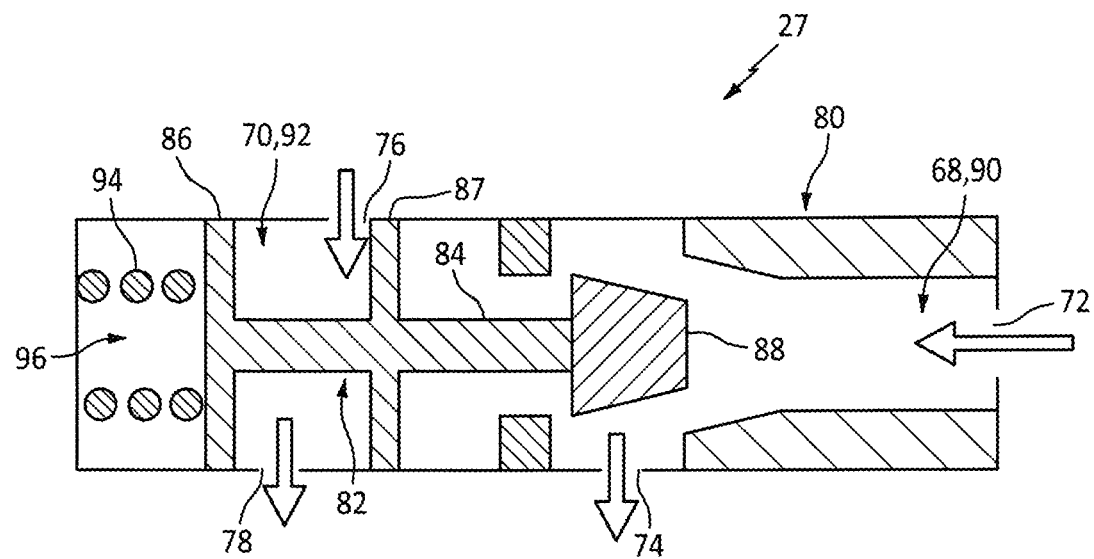
FIG. 2A is a sectional schematic illustration of a flow regulator for the lubrication system in an open position.
Figure 2B:
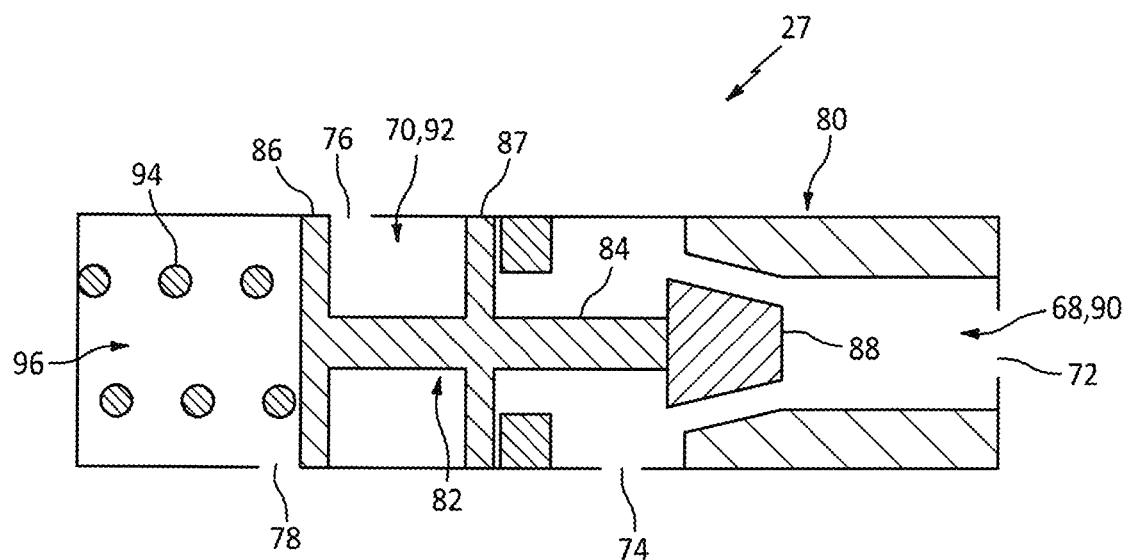
FIG. 2B is a sectional schematic illustration of the flow regulator in a closed position.

Referring to FIGS. 2A and 2B, the flow regulator 27 may include a fixed body 80 (e.g., a housing) and a moveable body 82 (e.g., an internal valve body). The moveable body 82 of FIGS. 2A and 2B is disposed within an internal bore of the fixed body 80. The moveable body 82 of FIGS. 2A and 2B includes a shaft 84 and one or more regulator elements 86-88. The regulator elements 86-88 are disposed longitudinally along and connected to the shaft 84. The regulator element 86 (e.g., a piston) is located at a first end of the shaft 84. The regulator element 87 (e.g., a piston) is located intermediately (e.g., midway) longitudinally between the regulator element 86 and the regulator element 88. The regulator element 88 (e.g., a plunger) is located at a second end of the shaft 84.

The moveable body 82 is configured to move longitudinally within the fixed body 80 between an (e.g., fully) open position (see FIG. 2A) and a closed position (see FIG. 2B). At the open position of FIG. 2A, the moveable body 82 is configured to fluidly couple the first regulator inlet 72 with the first regulator outlet 74 through an internal first chamber 90 of the first flowpath 68. The moveable body 82 is further configured to fluidly couple the second regulator inlet 76 with the second regulator outlet 78 through an internal second chamber 92 of the second flowpath 70. The flow regulator 27 and its moveable body 82 may thereby concurrently (e.g., simultaneously) open the first flowpath 68 and the second flowpath 70. By contrast, at the closed position of FIG. 2B, the moveable body 82 is configured to fluidly decouple the second regulator inlet 76 from the second regulator outlet 78. The moveable body 82, for example, may fluidly decouple the second chamber 92 from at least one of its ports; e.g., the second regulator outlet 78 of FIG. 2B. The flow regulator 27 and its moveable body 82 may thereby close the second flowpath 70. However, the first flowpath 68 may remain open. In particular, a (e.g., annular) gap between the regulator element 88 and the fixed body 80 may facilitate fluid flow from the first regulator inlet 72 to the first regulator outlet 74. At the closed position, however, the moveable body 82 may be configured to reduce fluid flow through the first flowpath 68 as compared to when the moveable body 82 is at its (e.g., fully) open position of FIG. 2A. The flow regulator 27 may thereby regulate (e.g., reduce, but not prevent) fluid flow through the first flowpath 68 by moving the moveable body 82 from its open position of FIG. 2A to its (e.g., partially) closed position of FIG. 2B.

The flow regulator 27 of FIGS. 2A and 2B further includes a biasing element 94; e.g., a spring. The biasing element 94 is arranged within an internal third chamber 96 of the flow regulator 27. This biasing element 94 is configured to bias (e.g., push) the moveable body 82 towards the closed position of FIG. 2B. A spring constant of the biasing element 94 may be selected such that, for example, the flow regulator 27 (e.g., only) opens the second flowpath 70 at or above a predetermined pressure threshold; e.g., associated with cold start.

The flow regulator 27 is described above and illustrated with an exemplary flow regulator configuration. The present disclosure, however, is not limited to such an exemplary flow regulator configuration. In particular, various other types and configurations of multi-flowpath flow regulators are known in the art, and the present disclosure is not limited to any particular ones thereof.

Referring again to FIG. 1, each turbine engine component 28-30 may be, may include or may be part of any component or structure of the turbine engine which may receive the lubricant. Each turbine engine component 28-30, for example, may be configured as a component of the turbine engine which is lubricated by, cooled by, heated by, actuated by and/or otherwise receives the lubricant during lubrication system operation. The turbine engine component 28 and/or the turbine engine component 29, for example, may each be configured as or otherwise include a bearing (e.g., a rolling element bearing, a plane bearing, etc.), a gear system (e.g., for the accessory gearbox, or for a geartrain interconnecting turbine engine rotors), a heat exchanger and/or a hydraulic actuator. The turbine engine component 30 may be configured as component (e.g., a reservoir, a gutter, etc.) with a lubricant scavenge cavity. Alternatively, the turbine engine component 30 may be configured as the reservoir 34. The present disclosure, however, is not limited to the foregoing exemplary turbine engine component configurations.

The turbine engine component 28 of FIG. 1 includes an internal volume 98 and a component inlet 100. The internal volume 98 is fluidly coupled with the component inlet 100. This internal volume 98 may be an internal cavity, passage and/or space within the turbine engine component 28 which is adapted to receive the lubricant. For example, the internal volume 98 may be or otherwise include a bearing compartment and/or interstices between bearing elements. In another example, the internal volume 98 may be or otherwise include a gear system compartment and/or interstices between gear system elements (e.g., between gear teeth). Of course, the turbine engine component 28 can be configured as various other turbine engine components configured to receive lubricant at a pressure higher than available at the feed inlet 46.

The turbine engine component 29 of FIG. 1 includes an internal volume 102 and a component inlet 104. The internal volume 102 is fluidly coupled with the component inlet 104. This internal volume 102 may be an internal cavity, passage and/or space within the turbine engine component 29 which is adapted to receive the lubricant. For example, the internal volume 102 may be or otherwise include a bearing compartment and/or interstices between bearing elements. In another example, the internal volume 102 may be or otherwise include a gear system compartment and/or interstices between gear system elements (e.g., between gear teeth).

The turbine engine component 30 of FIG. 1 includes an internal volume 106 and a component inlet 108. The internal volume 106 is fluidly coupled with the component inlet 108. This internal volume 106 may be an internal cavity, passage and/or space within the turbine engine component 30 which is adapted to receive the lubricant (e.g., only) during the bleed mode of FIG. 3A. For example, the internal volume 106 may be or otherwise include the lubricant scavenge cavity.

Referring still to FIG. 1, the feed circuits 23 and 24 are fluidly coupled in parallel (e.g., independent of one another) to the lubricant source 22. The feed inlet 46 and the feed inlet 56 of FIG. 1, for example, are connected to the source outlet 44/the main pump outlet 42 through a supply circuit 110. The component inlet 100 and, thus, the internal volume 98 are fluidly coupled with and downstream of the feed outlet 48. The component inlet 104 and, thus, the internal volume 102 are fluidly coupled with and downstream of the feed outlet 58.

Within the feed circuit 23, the boost pump inlet 52 is fluidly coupled with and downstream of the source outlet 44. The boost pump outlet 54 is fluidly coupled with and upstream of the bypass inlet 60 and the internal volume 98 through the component inlet 100.

The bypass inlet 60 is fluidly coupled with and downstream of the boost pump outlet 54, upstream of the component inlet 100 and, thus, the internal volume 98. The bypass outlet 62 is fluidly coupled with and upstream of the boost pump inlet 52, downstream of the source outlet 44. Within the bypass circuit 25, an upstream segment 112 of the bypass circuit 25 is fluidly coupled with and between the bypass inlet 60 and the first regulator inlet 72. A downstream segment 114 of the bypass circuit 25 is fluidly coupled with and between the bypass outlet 62 and the first regulator outlet 74.

The bleed inlet 64 is fluidly coupled with and downstream of the source outlet 44. The bleed inlet 64 of FIG. 1, for example, is fluidly coupled with the feed circuit 24, upstream of the turbine engine component 29 and its inlet 104. The bleed outlet 66 is fluidly coupled with and upstream of the turbine engine component 30 and its inlet 108. Within the bleed circuit 26, an upstream segment 116 of the bleed circuit 26 is fluidly coupled with and between the feed circuit 24 and the second regulator inlet 76. A downstream segment 118 of the bleed circuit 26 is fluidly coupled with and between the turbine engine component 30 and the second regulator outlet 78. More particularly, the downstream segment 118 of the bleed circuit 26 is fluidly coupled with and upstream of the component inlet 108 and, thus, the internal volume 106.

The fluid couplings between the various lubrication system components described above may be made by one or more fluid conduits; e.g., pipes, hoses, etc. The fluid couplings may also or alternatively be made by one or more internal volumes (e.g., passages, cavities, spaces, etc.) within and/or through one or more other components of the turbine engine. Alternatively, any one or more of the fluid couplings may be made directly without, for example, any intervening elements.

The sensor system 32 is configured to monitor one or more parameters of a flow of the lubricant from the lubricant source 22 to one or more of the feed circuits 23 and 24. The sensor system 32 of FIG. 1, for example, includes a fluid sensor 120 such as, but not limited to, a lubricant pressure sensor. This fluid sensor 120 is configured with (e.g., fluidly coupled inline with) the supply circuit 110 which provides the lubricant to the feed circuits 23 and 24 from the lubricant source 22. The present disclosure, however, is not limited to such an exemplary fluid sensor location. For example, in other embodiments, the fluid sensor 120 may be configured with the feed circuit 24, upstream of the bleed inlet 64.

Figure 3A:
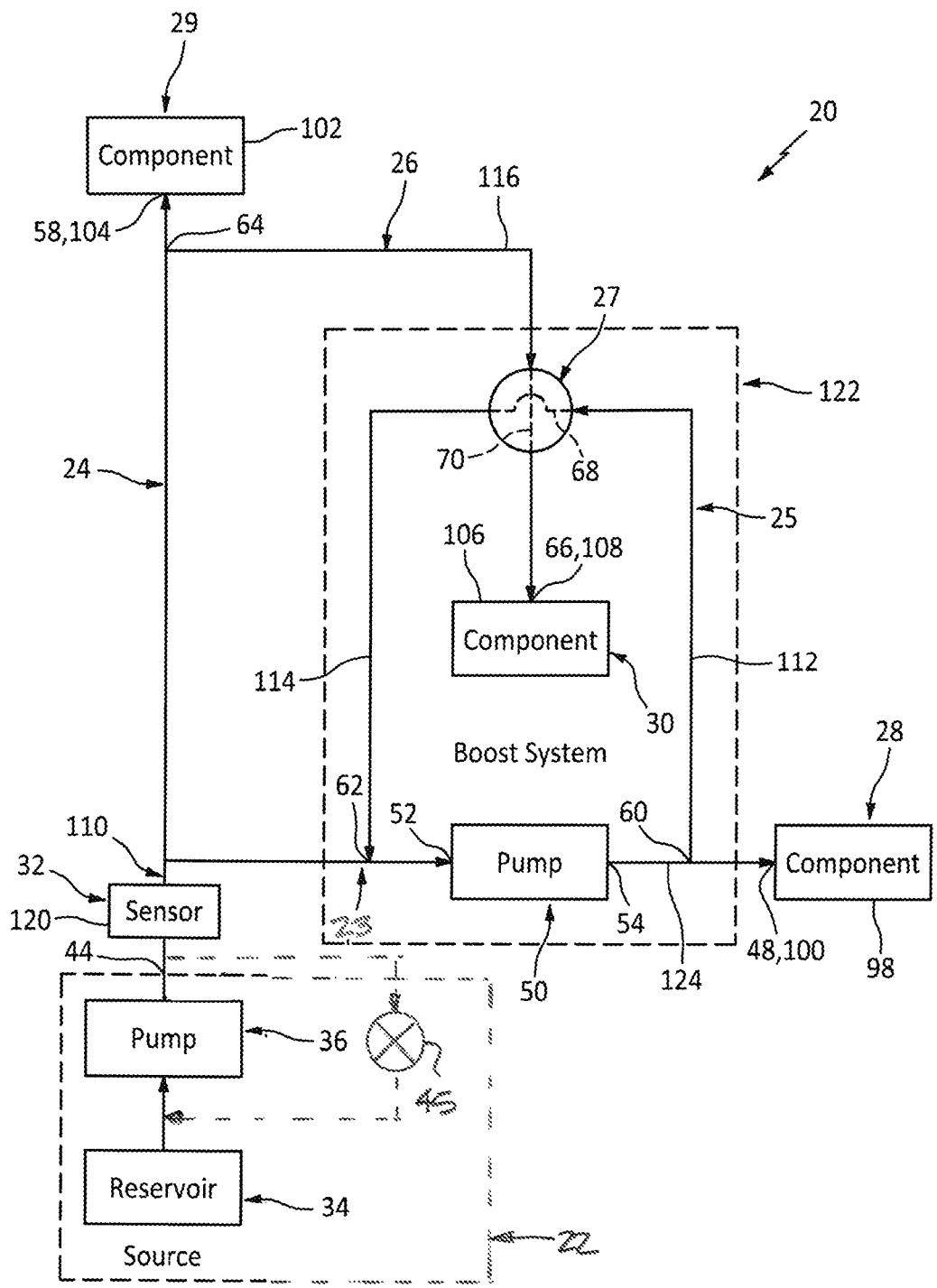
FIG. 3A is a schematic illustration of the lubrication system with the flow regulator in the open position.
Figure 3B:
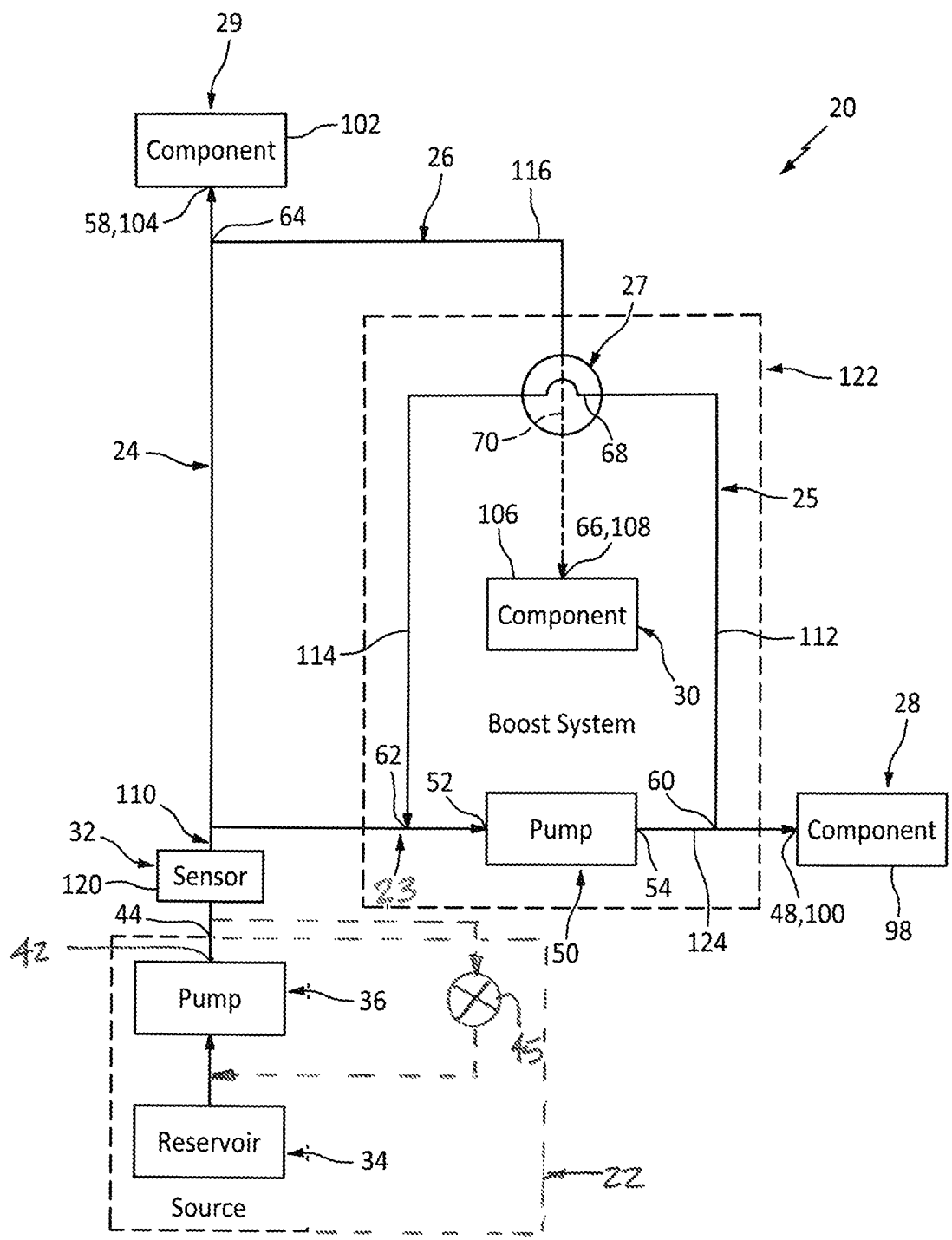
FIG. 3B is a schematic illustration of the lubrication system with the flow regulator in the closed position.

Referring to FIGS. 3A and 3B, during lubrication system operation, the lubricant source 22 directs (e.g., pumps) the lubricant through the supply circuit 110 to the feed circuit 23 and the feed circuit 24. The feed circuit 23 directs the lubricant through a lubricant boost system 122 to the turbine engine component 28 and its internal volume 98, where the boost system 122 includes the lubrication system components 23, 25, 27 and 50. In particular, the lubricant received from the lubricant source 22 flows to the boost pump 50. The boost pump 50 boosts (e.g., increases) the pressure of the lubricant. The boost pump 50 directs (e.g., pumps) the pressure boosted lubricant to the turbine engine component 28 and its internal volume 98. However, to check and/or alleviate pressure exerted by the pressure boosted lubricant on the turbine engine component 28 and its internal volume 98, the bypass circuit 25 of FIGS. 3A and 3B are opened via the flow regulator 27 (e.g., see FIG. 2A and 2B) to bleed off some of the pressure boosted lubricant from a downstream segment 124 of the feed circuit 23. The bypass circuit 25 directs (e.g., flows) the bled lubricant back towards the boost pump inlet 52. In this manner, during lubrication system operation, the lubricant received by the turbine engine component 28 may not be over-pressurized by the boost pump 50.

The boost system 122 of FIGS. 3A and 3B may be designed (e.g., optimized) for use during the normal lubrication system operation when, for example, the lubricant is at its normal working temperature and pressure; e.g., the lubricant temperature and pressure while the turbine engine and an associated aircraft are at cruise. During such normal lubrication system operation, the lubricant within the lubrication system 20 is relatively hot and, thus, may have a relatively low viscosity. By contrast, during cold start operation, the lubricant within the lubrication system 20 may be relatively cold and, thus, may have a relatively high viscosity; e.g., the lubricant may be relatively viscous. As a result of this relatively high viscosity, the pressure of the pressure boosted lubricant output by the boost pump 50 may be higher than during normal lubrication system operation. Thus, during cold start operation as shown in FIG. 3A, the flow regulator 27 may further open the bypass circuit 25 to reduce the pressure of the lubricant received by the turbine engine component 28.

Various components of a turbine engine may be subject to damage and/or failure following an extended use. While damage and/or failure may be mitigated by periodically replacing certain components, there is still value in monitoring certain components and/or systems for possible damage and/or failure in order to mitigate further turbine engine damage. For example, there is value in monitoring the flow regulator 27 of FIG. 1 for damage and/or failure during lubrication system operation. For example, if the flow regulator 27 became stuck in its (e.g., completely) open position of FIG. 2A, the turbine engine component 28 of FIG. 1 may not receive adequate lubricant under certain conditions. Depriving the turbine engine component 28 of adequate lubricant may lead to damage and/or failure of the turbine engine component 28.

The sensor system 32 of FIG. 1 may be used for monitoring the flow regulator 27. More particularly, the sensor system 32 may be used for detecting a malfunction of the flow regulator 27. For example, during normal operation, the flow regulator 27 is configured in its closed position of FIG. 2B. At this closed position, the flow regulator 27 of FIG. 3B partially closes the bypass circuit 25 and (e.g., completely) closes the bleed circuit 26. Thus, little or none of the lubricant flowing through the feed circuit 24 will be bled to the turbine engine component 30. Therefore, when the flow regulator 27 and its moveable body 82 (see FIG. 2B) are in the closed position, the overall lubricant pressure observed by the sensor system 32 and its sensor 120 may be relatively high. However, during the cold start operation, the flow regulator 27 is configured in its open position of FIG. 2A. At this open position, the flow regulator 27 of FIG. 3A further (e.g., completely) opens the bypass circuit 25 and (e.g., completely) opens the bleed circuit 26. Thus, a portion of the lubricant flowing through the feed circuit 24 is bled to the turbine engine component 30. Therefore, when the flow regulator 27 and its moveable body 82 (see FIG. 2A) are in the open position, the overall lubricant pressure observed by the sensor system 32 and its sensor 120 may be relatively low.

Given the foregoing, the sensor system 32 may determine (e.g., infer) when the flow regulator 27 is malfunctioning without, for example, requiring an additional sensor with the boost system 122 and/or the turbine engine component 28. For example, if the flow regulator 27 is commanded (or expected) to move from its open position (see FIG. 2A) to its closed position (see FIG. 2B), the sensor system 32 may determine the moveable body 82 of the flow regulator 27 is stuck in the open position where lubricant pressure measured by the fluid sensor 120 is lower than expected. By contrast, if the lubrication system 20 was alternatively configured without the bleed circuit 26, the lubricant pressure observed by the fluid sensor 120 would not change due to a flow regulator malfunction.

Figure 4:
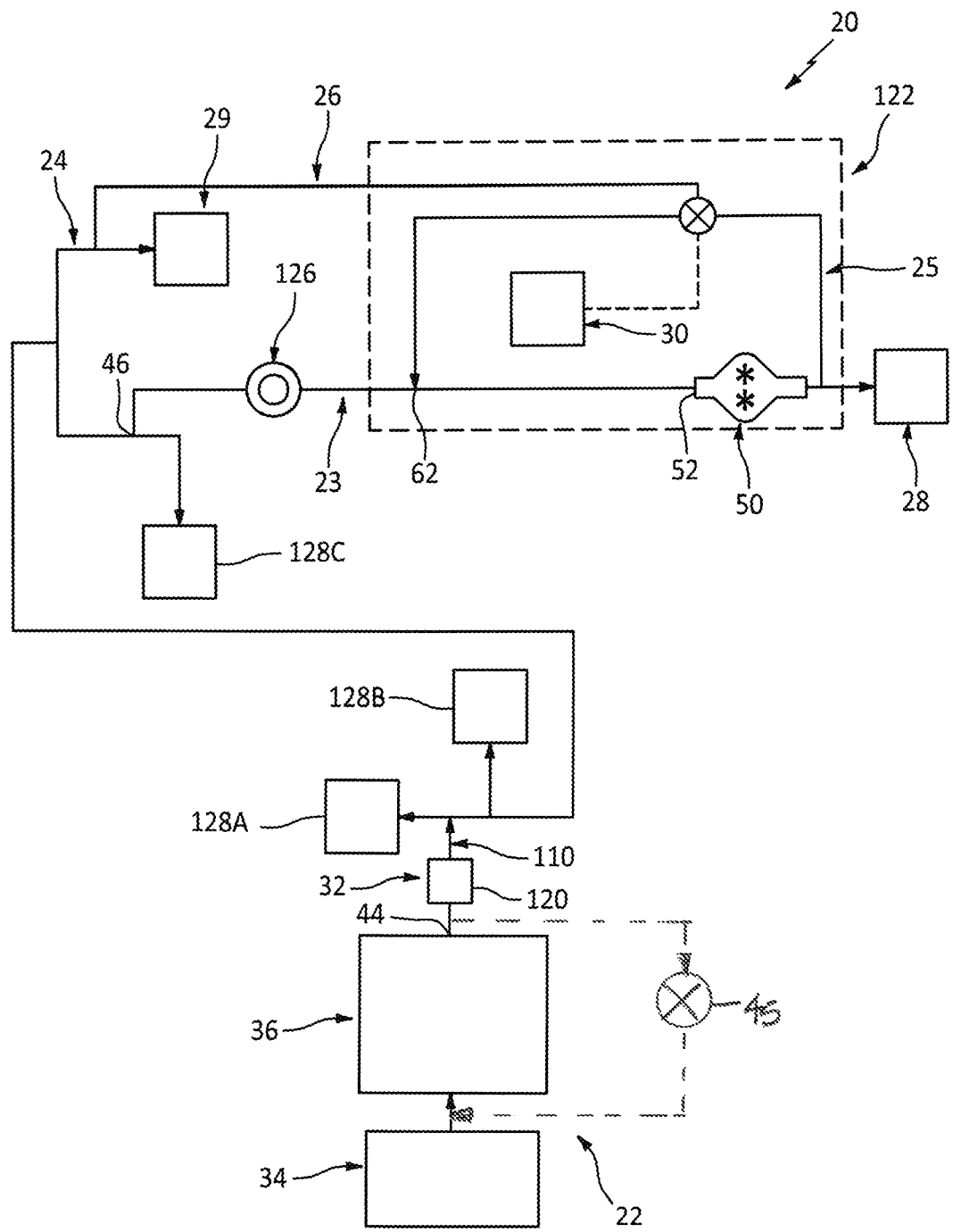
FIG. 4 is a schematic illustration of the lubrication system configured with a flow restrictor and additional turbine engine components.

In some embodiments, referring to FIG. 4, the lubrication system 20 may include a lubricant flow restrictor 126; e.g., a metering valve or orifice. The flow restrictor 126 of FIG. 4 is fluidly coupled between the source outlet 44 and the boost pump inlet 52, upstream of the bypass outlet 62. More particularly, the flow restrictor 126 of FIG. 4 is configured inline with the feed circuit 23 between the feed inlet 46 and the bypass outlet 62.

In some embodiments, the lubrication system 20 may include one or more additional turbine engine components 128A-C (generally referred to as "128") configured with one or more additional feed circuits. Each of these turbine engine components 128 may include a respective internal volume configured to receive the lubricant. These turbine engine components 128 and their internal volumes, however, may be arranged in parallel with and/or upstream of the boost system 122. The turbine engine components 128 and their internal volumes may thereby receive the lubricant from the lubricant source 22, not from the boost pump 50.

Figure 5:
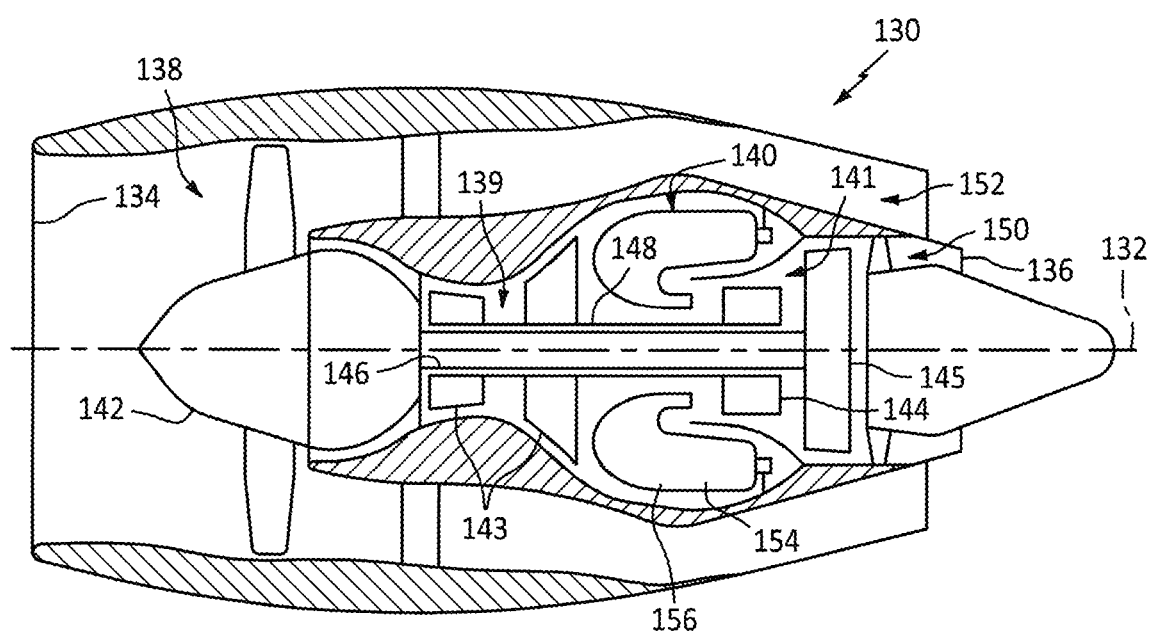
FIG. 5 is a schematic illustration of a turbine engine with which the lubrication system may be configured.

FIG. 5 illustrates an example of the turbine engine with which the lubrication system 20 may be configured. This turbine engine is configured as a turbofan gas turbine engine 130. The turbine engine 130 of FIG. 5 extends along a centerline 132 of the turbine engine 130 between an upstream airflow inlet 134 and a downstream airflow exhaust 136. The turbine engine includes a fan section 138, a compressor section 139, a combustor section 140 and a turbine section 141.

The fan section 138 includes a fan rotor 142. The compressor section 139 includes a compressor rotor 143. The turbine section 141 includes a high pressure turbine (HPT) rotor 144 and a low pressure turbine (LPT) rotor 145, where the LPT rotor 145 is configured as a power turbine rotor. Each of these rotors 142-145 includes a plurality of rotor blades arranged circumferentially around and connected to one or more respective rotor disks.

The fan rotor 142 is connected to the LPT rotor 145 through a low speed shaft 146. The compressor rotor 143 is connected to the HPT rotor 144 through a high speed shaft 148. The low speed shaft 146 extends through a bore of the high speed shaft 148 between the fan rotor 142 and the LPT rotor 145. The low speed shaft 146 and the high speed shaft 148 are rotatably supported by one or more bearings (not shown), one or more of which bearings may be serviced by the lubrication system 20.

During operation, air enters the turbine engine through the airflow inlet 134. This air is directed through the fan section 138 and into a core flowpath 150 and a bypass flowpath 152. The core flowpath 150 extends sequentially through the engine sections 139-141; e.g., an engine core. The air within the core flowpath 150 may be referred to as "core air". The bypass flowpath 152 extends through a bypass duct, which bypasses the engine core. The air within the bypass flowpath 152 may be referred to as "bypass air".

The core air is compressed by the compressor rotor 143 and directed into an annular combustion chamber 154 of an annular combustor 156 in the combustor section 140. Fuel is injected into the combustion chamber 154 and mixed with the compressed core air to provide a fuel-air mixture. This fuel-air mixture is ignited and combustion products thereof flow through and sequentially cause the HPT rotor 144 and the LPT rotor 145 to rotate. The rotation of the HPT rotor 144 drives rotation of the compressor rotor 143 and, thus, compression of air received from an inlet into the core flowpath 150. The rotation of the LPT rotor 145 drives rotation of the fan rotor 142, which propels bypass air through and out of the bypass flowpath 152. The propulsion of the bypass air may account for a significant portion (e.g., a majority) of thrust generated by the turbine engine.

The lubrication system 20 may be included in various turbine engines other than the ones described above. The lubrication system 20, for example, may be included in a geared turbine engine where a gear train connects one or more shafts to one or more rotors in a fan section, a compressor section and/or any other engine section. Alternatively, the lubrication system 20 may be included in a turbine engine configured without a gear train; e.g., a direct drive turbine engine. The lubrication system 20 may be included in a geared or non-geared turbine engine configured with a single spool, with two spools (e.g., see FIG. 5), or with more than two spools. The turbine engine may be configured as a turbofan engine, a turbojet engine, a propfan engine, a pusher fan engine, an auxiliary power unit (APU) or any other type of turbine engine. The present disclosure therefore is not limited to any particular types or configurations of turbine engines. In addition, while the turbine engine is described above for use in an aircraft application, the present disclosure is not limited to such aircraft applications. For example, the turbine engine may alternatively be configured as an industrial gas turbine engine, for example, for a land based power plant.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A lubrication system for a turbine engine, comprising:
  a lubricant source including a source outlet;
  a plurality of feed circuits fluidly coupled with the source outlet in parallel, the plurality of feed circuits including a first feed circuit and a second feed circuit, the second feed circuit comprising a pump that includes a pump inlet and a pump outlet;
  a bypass circuit fluidly coupled with the pump inlet and the pump outlet;
  a bleed circuit fluidly coupled with the first feed circuit;
  a flow regulator configured to regulate flow through the bypass circuit during a first mode of operation and a second mode of operation, and the flow regulator configured to close the bleed circuit during the second mode of operation; and
  a sensor system configured to monitor fluid flow directed to at least one of the first feed circuit or the second feed circuit.

2. The lubrication system of claim 1, wherein
  the flow regulator comprises a first chamber, a second chamber and a moveable body;

the first chamber is configured to fluidly couple a first segment of the bypass circuit with a second segment of the bypass circuit when the moveable body is in a first position and a second position; and the second chamber is configured to fluidly couple a first segment of the bleed circuit with a second segment of the bleed circuit when the moveable body is in the first position, and the second chamber is configured to be fluidly decoupled from at least one of the first segment of the bleed circuit or the second segment of the bleed circuit when the moveable body is in the second position.

3. The lubrication system of claim 2, wherein
the flow regulator further comprises a third chamber and a biasing element;
the biasing element is arranged within the third chamber, and the biasing element is configured to bias the moveable body towards the second position.

4. The lubrication system of claim 3, wherein the third chamber is fluidly coupled with the second segment of the bleed circuit when the moveable body is in the second position.

5. The lubrication system of claim 1, wherein the sensor system is configured to detect a malfunction of the flow regulator.

6. The lubrication system of claim 1, wherein the sensor system comprises a fluid pressure sensor.

7. The lubrication system of claim 1, further comprising a turbine engine component including an internal volume, the internal volume fluidly coupled with the pump outlet downstream of the bypass circuit.

8. The lubrication system of claim 1, further comprising a turbine engine component including an internal volume, the bleed circuit fluidly coupling the first feed circuit to the internal volume during the first mode of operation.

9. The lubrication system of claim 1, further comprising a turbine engine component including an internal volume, the internal volume fluidly coupled to the first feed circuit downstream of the bleed circuit.

10. The lubrication system of claim 1, wherein the second feed circuit further includes a flow restrictor fluidly coupled with and between the source outlet and the pump inlet.

11. The lubrication system of claim 1, further comprising:
a turbine engine component including an internal volume;
the plurality of feed circuits further including a third feed circuit that fluidly couples the source outlet to the internal volume.

12. The lubrication system of claim 1, wherein
the pump comprises a first pump;
the lubricant source comprises a second pump and a lubricant reservoir; and
the second pump is fluidly coupled with and between the lubricant reservoir and the plurality of feed circuits.

13. The lubrication system of claim 1, wherein the pump comprises a boost pump.

14. The lubrication system of claim 1, wherein the first mode of operation is a cold start mode of operation.

15. A lubrication system for a turbine engine, comprising:
a lubricant source including a source outlet;
a first turbine engine component including a first volume, the first volume fluidly coupled with the source outlet;
a pump including a pump inlet and a pump outlet, the pump inlet fluidly coupled with the source outlet in parallel with the first volume;

a bypass circuit including a bypass inlet and a bypass outlet, the bypass inlet fluidly coupled with the pump outlet, and the bypass outlet fluidly coupled with the pump inlet;
a bleed circuit including a bleed inlet and a bleed outlet, the bleed inlet fluidly coupled with the source outlet upstream of the first volume;
a second turbine engine component including a second volume, the second volume fluidly coupled with the bleed outlet;
a flow regulator configured to facilitate fluid flow through the bypass circuit and to facilitate fluid flow through the bleed circuit during a first mode of operation, and the flow regulator configured to prevent fluid flow through the bleed circuit during a second mode of operation; and
a sensor system configured to monitor fluid flow downstream of the source outlet.

16. The lubrication system of claim 15, wherein
the flow regulator comprises a first chamber, a second chamber and a moveable body;
the first chamber is configured to fluidly couple an upstream segment of the bypass circuit with a downstream segment of the bypass circuit when the moveable body is in an open position, and the first chamber is further configured to fluidly couple the upstream segment of the bypass circuit with the downstream segment of the bypass circuit when the moveable body is in a closed position; and
the second chamber is configured to fluidly couple an upstream segment of the bleed circuit with a downstream segment of the bleed circuit when the moveable body is in the open position, and the second chamber is configured to be fluidly decoupled from at least one of the upstream segment of the bleed circuit or the downstream segment of the bleed circuit when the moveable body is in the closed position.

17. The lubrication system of claim 15, further comprising a third turbine engine component including a third volume, the third volume fluidly coupled with the pump outlet downstream of the bypass inlet.

18. The lubrication system of claim 17, wherein the sensor system is configured to detect a low flow condition to the third turbine engine component.

19. A lubrication system for a turbine engine, comprising
a boost pump including a pump inlet and a pump outlet;
a first turbine engine component including a first volume, the first volume fluidly coupled with and downstream of the pump outlet;
a bypass circuit including a bypass inlet and a bypass outlet, the bypass inlet fluidly coupled with the pump outlet upstream of the first volume, and the bypass outlet fluidly coupled with and upstream of the pump inlet;
a second fluid circuit configured in parallel with the boost pump; and
a valve configured to
facilitate fluid flow through the bypass circuit and through the second fluid circuit during a first mode of operation; and
prevent fluid flow through the second fluid circuit during a second mode of operation.

20. The lubrication system of claim 19, further comprising
a sensor system with a sensor fluidly coupled in parallel with the pump inlet and the second fluid circuit;

the sensor system configured to detect when the valve is stuck in an open position during the second mode of operation, wherein the valve is configured to facilitate fluid flow through the bypass circuit and through the second fluid circuit when in the open position.

* * * * *